United States Patent [19]

Haguenier

[11] Patent Number: 4,750,955
[45] Date of Patent: Jun. 14, 1988

[54] ULTRASONIC HEATSEALING FOR SECURING CARTON BLANKS TO ARTICLES IN FORMING A PACKAGE

[75] Inventor: Hubert Haguenier, Chateauroux, France

[73] Assignee: The Mead Corporation, Dayton, Ohio

[21] Appl. No.: 27,375

[22] Filed: Mar. 18, 1987

[30] Foreign Application Priority Data

Mar. 18, 1986 [GB] United Kingdom ............... 8606640

[51] Int. Cl.⁴ .................. B29C 65/08; B32B 31/20
[52] U.S. Cl. ................................. 156/69; 53/379;
53/488; 156/73.1; 156/216; 156/580.1;
156/580.2; 493/102
[58] Field of Search ............ 156/73.1, 216, 69, 477.1,
156/479, 580.1, 580.2; 53/158, 487, 488, 290,
378, 379, 380; 493/102; 264/23

[56] References Cited

U.S. PATENT DOCUMENTS

| | | | |
|---|---|---|---|
| 2,970,634 | 2/1961 | Hantscho | 156/216 |
| 3,088,343 | 5/1963 | Balamuth et al. | |
| 3,272,682 | 9/1966 | Balamuth et al. | 156/580.1 |
| 3,505,136 | 4/1970 | Attwood | 156/580.1 |
| 3,562,041 | 2/1971 | Robertson | 156/73.1 |
| 3,715,073 | 2/1973 | Gibbs et al. | 53/488 |
| 4,187,768 | 2/1980 | Suzuki | 156/73.1 |
| 4,280,865 | 7/1981 | Simonton | 156/580.1 |
| 4,301,640 | 11/1981 | Haas | 53/488 |
| 4,399,491 | 8/1983 | Kackenmeister | 156/216 |
| 4,588,390 | 5/1986 | Heitele et al. | 493/133 |
| 4,618,516 | 10/1986 | Sager | 428/35 |

FOREIGN PATENT DOCUMENTS 2084920 4/1982 United Kingdom .

Primary Examiner—Michael Wityshyn
Attorney, Agent, or Firm—Erwin Doerr

[57] ABSTRACT

An ultrasonic heatsealing mechanism and process for securing portions of a carton blank to at least one flanged container in which the surfaces to be secured are susceptible to ultrasonic heatsealing. The mechanism comprises a resiliently mounted ultrasonic horn and a series of movable counterpart elements spaced from an adjacent tip of the horn so that the counterpart elements move relative to the end of the horn one after the other. Means are provided to move the container and blank so that overlapping surfaces to be heatsealed together are passed with the counterpart elements longitudinally with respect to the horn tip means being provided to activate the horn at least when the surfaces and at least one counterpart element are present together adjacent said end of the horn so that heat-sealing can occur and causing the horn to move resiliently so that a constant gap between the tip of the horn and that counterpart element is maintained substantially constant during the heatsealing process.

8 Claims, 3 Drawing Sheets

ULTRASONIC HEATSEALING FOR SECURING CARTON BLANKS TO ARTICLES IN FORMING A PACKAGE

This invention relates to a method and a mechanism for securing materials together by means of ultrasonic heatsealing and is particularly suitable for forming a multi-unit package comprising a group of containers having outwardly extending flanges to which a paperboard blank is secured by ultrasonic heatsealing.

U.S. Pat. No. 3,562,041 discloses an ultrasonic heatsealing process in which a pair of materials to be heatsealed to one another are passed together with so-called anvil or counterpart plates beneath the tip of an ultrasonic horn. In this arrangement the materials (and the anvils) pass transversely of the horn tip so that the contact time during which the materials are subjected to ultrasonic bombardment is limited in relation to the width of the tip of the horn. Moreover the tip of the horn is set at a fixed distance from the juxtaposed face of the anvils during the heatsealing process.

Heatsealing by means of an elongate ultrasonic horn extending in the direction of the weld seam to be formed is however known e.g. from U.S. Pat. No. 3,088,343.

The present invention seeks to satisfy the requirements of producing satisfactory seal strength achieved in a relatively rapid process. In this regard, it will be appreciated that there is a direct relationship between the strength of the seal, the contact time of the materials beneath the horn and the gap between the horn tip and counterplate elements (anvils). The present invention recognises the advantage in keeping a substantially constant gap throughout the heatsealing process where the thickness of one of the materials alters e.g. due to some degree of melting during the sealing process.

One aspect of the invention provides a method of forming a package whereby a blank of paperboard or similar foldable sheet material is secured to the top of a container made of thermoplastic material and having opposed outwardly projecting flanges at the top thereof and said blank comprises a top panel and securing strips foldably joined to the side edges of said top panel, which method comprises the steps of (a) applying said blank to the top of said container so that the top panel covers the top of said container and said securing strips extend beyond the flanges thereof, (b) folding said securing strips of said blank into contact with the undersides of said flanges so that at least portions of said flanges are interposed between portions of said top panel and said securing strips to form overlapped side edge portions.

(c) applying pressure to said overlapped side edge portions and simultaneously subjecting said portions to ultrasonic energy whereby the interior surfaces of said securing strips are welded to the undersides of said container flanges.

An embodiment of the invention will now be described by way of example, with reference to the accompanying drawings, in which:

FIGS. 1a to 1d are schematic cross-sectional end views showing sequentially the manner in which the blank is applied, folded and heat-sealed to the container group;

Figure 5:
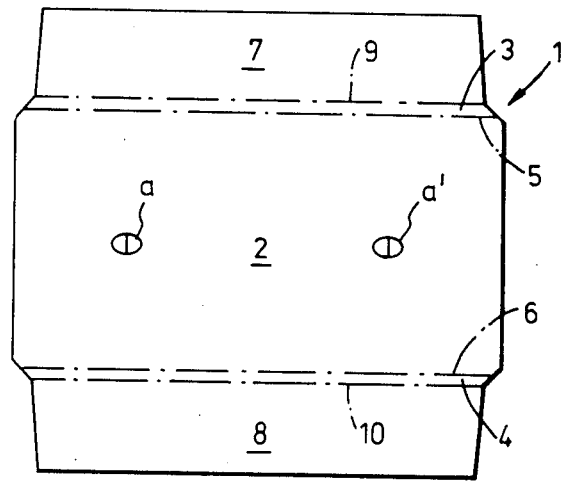
FIG. 5 is a plan view of a paperboard blank suitable for application to a group of containers, in accordance with the invention.

Referring first to FIG. 5, an elongate blank 1 is formed from paperboard or similar foldable sheet material and which comprises a top panel 2 having spaced apertures a, a1. Securing strips 3, 4 are hinged to respective ones of the longitudinal edges of the top panel along fold lines 5, 6 respectively. A side panel 7 is hinged to securing strip 3 along fold line 9 and a side panel 8 is hinged to securing strip 4 along fold line 10.

Figure 5A:
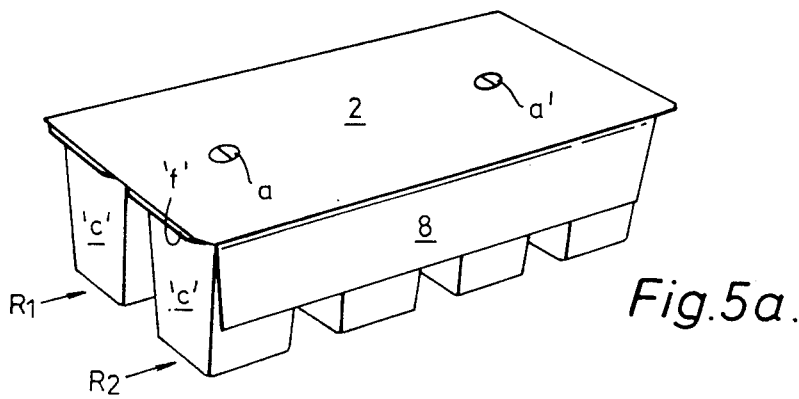
FIG. 5a is a perspective view of a completed package formed according to the invention.

To form the completed package shown e.g. in FIG. 5a, the blank 1 is applied to a group 'G' of containers so that the top panel 1 lies on the tops of the containers in the group and the securing strips 3, 4 brought into abutment with and heat-sealed to the underfaces of the flanges 'f' of the containers in each of the rows R1, R2 by folding the blank along fold lines 5, 9 and 6, 10. This folding operation which is described in detail hereinafter brings each of the side panels 7, 8 into abutment with the exposed faces of the containers at the sides of the package.

Referring now to FIGS. 1 and 1a–1d, there is shown a packaging machine 'M' for applying the paperboard blank 1 to a group of articles in a continuous operation. The blank 1 may be applied to a single container possibly providing a closure lid thereof; or a single row of containers; or more usually a group of containers arranged in two or more parallel rows. In this embodiment the blank is applied to a group of eight plastics containers arranged in two rows $R^1$, $R^2$ of four containers per row. The containers are pots or cups having outwardly extending flanges 'f' at their tops and each container is secured by a portion of its top flange 'f' to another immediately adjacent container in the group. This securing arrangement for such flanged cups has become well known for selling popular foodproducts such as yogurt and desserts. Each cup in the group can be readily detached from an adjacent cup by a frangible connection between the respective connected top flanges.

At the infeed end of the machine 'M' which corresponds to the location of flow arrow 'F', an infeed platform 12 is provided along which a container group 'G1' is supported and conveyed. The platform 12 is provided with an upstanding central guide 12a to prevent the container group 'G1' being dislodged transversely of the infeed platform. A flow regulator device comprising a horizontally rotatable disc 14 is disposed alongside the infeed platform and has a periphery which is formed to provide an annular series of projections 14a. The projections are spaced apart so as to be insertable between successive containers in each group as that group passes the disc and thereby regulates the linear speed of the container group. A similar flow regulator may be provided at an opposed location to that of disc 14, adjacent the infeed platform 12.

The container group at position 'G2' is then engaged and further conveyed along the infeed platform by a timing assembly 16 comprising an endless timing chain 16a entrained about horizontally disposed spaced sprockets 16b, 16c. The timing chain 16a carries a series of lugs 16d of generally 'L'-shaped form, each of which engages the trailing edge of a container group so that the group 'G2' is pushed along the infeed platform and onto the upper reach of a moving conveyor assembly 20 contiguous therewith as will be described shortly. At position 'G2', a blank 'B2' is applied to the container group 'G2' from a supply of blanks 'B1' held in a hopper (not shown) above the infeed platform. The blanks 'B1' are removed from the hopper successively by a known rotatable feed device 18 having a plurality of suction-cup arms 18a. The timing assembly 16 and the blank feed device 18 are driven in synchronism so that successive blanks are applied onto the tops of the containers as each container group arrives at position 'G2' on the infeed conveyor. A similar timing assembly may be provided at an opposed location to that of assembly 16 adjacent the infeed platform and moving conveyor assembly 20.

The moving conveyor assembly 20 comprises a pair of side-by-side endless conveyor belts 22, 24 which are closely spaced apart by a continuation of central guides 12a so that one row R1 of containers in each group is seated on one belt and the other row R2 of containers in that group is seated on the neighbouring belt. The belts 22 and 24 are driven in unison by common longitudinally spaced drive wheels 26, 28 respectively.

A parallel overhead conveyor assembly 30 is mounted above the conveyor assembly 20 and comprises an endless belt 32 entrained about spaced drive wheels 34, 36 whose axes are parallel to those of drive wheels 26 and 28. Belts 22, 24 and 32 are driven in synchronism. Belt 32 has a lower working reach which is spaced above the upper working reach of the belts 22, 24 by an amount which is approximately the height of a container group 'G'. Generally, the overhead belt is positioned so that its lower working reach applies downward pressure onto the container groups below. Belt 32 is formed with a series of transverse locator bars 38 arranged in spaced apart pairs such that the distance between a pair of locator bars 38-38a approximates the longitudinal dimension of a container group. Belt 32 also carries a series of pairs of locator studs 40 each pair of studs being disposed between a pair of the located bars 38-38a. The locator bars and studs are provided to ensure that each of the carton blanks is maintained in its correct position relative to a container group along the working reaches of upper and lower conveyor assemblies 20 and 30. Thus, at the position of container group 'G3' which corresponds to the infeed end of the conveyor assemblies 20, 30, the container group is located at its leading end by a locator bar 38a, at its trailing end by a locator bar 38 and locator studs 40 are engaged in the spaced apertures a,a, for the top panel 2 of the blank. A schematic end view of the container group at position 'G3' is shown in FIG. 1a from which it can be seen that the blank 'B3' has its top panel centrally positioned and engaged with the tops of the containers in the group and its side panels disposed in the same horizontal plane as the top panel.

As the container group moves downstream of flow path 'F', it enters a folding section of the machine. The blank of the container group is then subjected to an initial folding operation in which the side wall panels 7, 8 together with the securing strips 3, 4 are folded substantially vertically downwards relative to the top panel as shown schematically in FIG. 1b. This initial folding operation is accomplished by means of static fold bars only one of which 42 is shown disposed on either side of the conveyor assembly 20. Each static fold bar is forwardly and downwardly inclined so that the side panels together with securing strips 3, 4 are progressively folded downwards about fold lines 5, 6 respectively as the container group advances. The container group at position G4 is nearing the completion of this folding oeration. In a subsequent folding operation it is necessary to bring the securing strips 3, 4 of the blank into face contacting relationship with the undersides of the container flanges 'f' as shown in FIG. 1c preparatory to heat-sealing the securing strips to the undersides of the flanges by means of ultrasonic welding. This subsequent folding operation is accomplished by folding blocks only one of which, 44, is shown and which are disposed on either side of the conveyor assembly 20. Each folding block 44 has a cuneiform upstream end which has an upwardly inclined ramp surface 46 increasing in height in the feed direction of the container group and thereafter a contiguous uppermost horizontal surface 48. As the container group advances, the securing strips of the blank are caused to engage the ramp surfaces of the folding blocks and the strips and their associated side panels progressively are folded about fold lines 5, 9; 6, 10 so that the securing strips are folded around and are folded into face contacting relationship with the container flanges and thereafter maintained in this folded condition by the upper horizontal surface 48 of the folding block.

The downstream end of the horizontal surface of folding block 44 is contiguous with an upper reach of an endless set of counterpart blocks 52 at an ultrasonic heat-sealing station. At the completion of the folding operation the container group is at position 'G5' and the wrapper blank is disposed as depicted in FIG. 1c, ready for heat-sealing as shown schematically in FIG. 1d.

Figure 2:
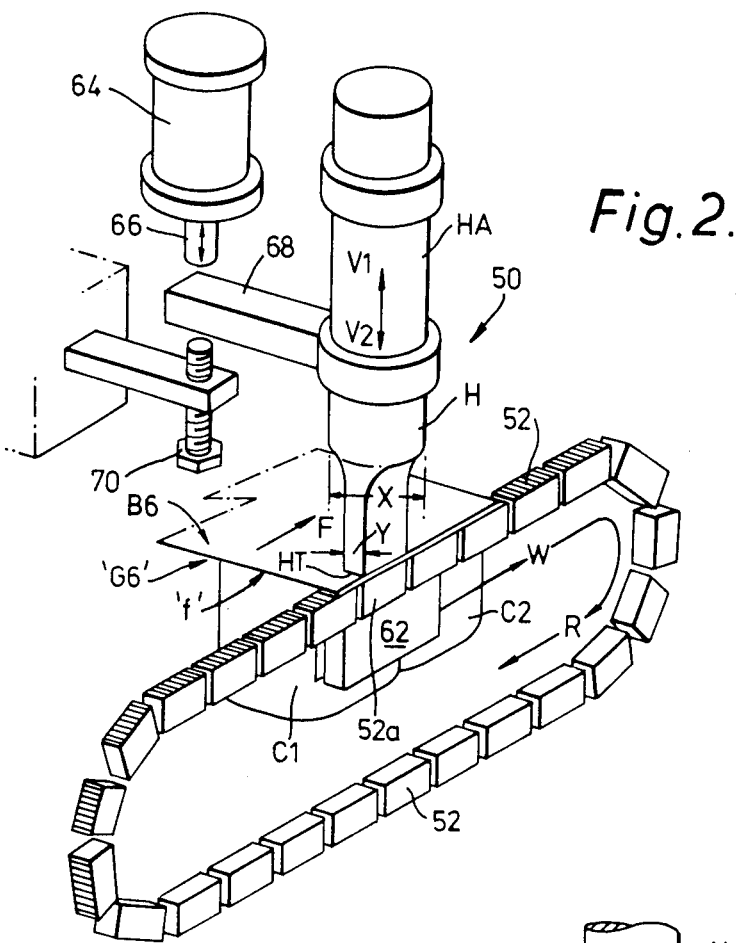
FIG. 2 is a schematic perspective view of an ultrasonic heat-sealing mechanism incorporated in the machine shown in FIG. 1.
Figure 3:
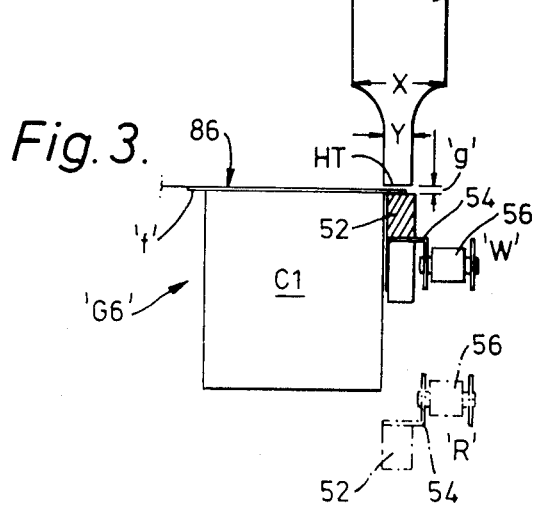
FIG. 3 is a schematic end view in partial cross-section, of the mechanism shown in FIG. 2.

Referring now additionally to FIGS. 2 and 3 of the drawings, an ultrasonic heat-sealing mechanism is located on either side of conveyor 30, only one of which, designated reference numeral 50, is shown. Mechanism 50 comprises an ultrasonic horn H disposed in an upright attitude at the lower end of an amplifier HA is mounted for resilient vertical movement relative to the container group carton blank feed path 'F'.

A continuous set of counterpart blocks 52 which are metallic or may be some other suitable material is mounted for movement in an endless path having a working reach 'W' and a return reach 'R'. Each of the blocks is caused to pass alongside the feed path 'F' in succession beneath the horn so that in the working reach they pass beneath and support the container flanges. The tip HT of the horn and each block 52 is of like longitudinal dimension as measured in the direction of flow 'F'. The horn is activated by a suitable energy source via the amplifier HA so as to emit ultrasonic waves from its tip. Each block 52 is carried by a respective lug 54 fixed to project from one side of an endless chain 56 (FIG. 3). The chain is entrained about spaced sprockets 58 and 60 respectively and is driven from a suitable drive source in synchronism with carton flow. Within the working reach 'W' in the vicinity of the horn tip, a static guide 62 is provided to support the counterpart blocks 52 as they pass beneath the horn.

Container group G6 is only partially depicted in FIGS. 2 and 3 in which a pair of containers 'C1', 'C2' of one row are shown in tandem, each container having a top flange 'f' sealed with a lid of plastics or aluminum material.

The blank 'B6' enters the working reach 'W' in the configuration shown in FIGS. 1d and 2. The containers together with the over-wrapped blank are conveyed along the feed path 'F' in synchronism with the moving counterpart blocks 52. As will be seen, the container flanges (at one side of the container) including portions of the wrapper wrapped thereabout pass beneath the horn tip HT so that the underflange securing panel 3 (or 4) lies atop a plurality of the counterpart blocks. At the horn location where counterpart block 52a is momentarily present heatsealing takes place. The sealing ultrasonic vibrations are created between the container flanges and the counterpart block 52a which supports securing strip 3 so that the strip 3 is heatsealed to the undersurface of the container flange.

Thus a heat seal is obtained between the container flanges and securing strip 3 corresponding to the presence of a counterpart block 52a beneath the ultrasonic horn tip. Preferably the counterpart blocks may be disposed in abutting relationship to produce a substantially continuous seal. Of course, in order to accomplish heatsealing of the containers and wrapper blank at the opposed side of the carton, a similar mechanism is located parallel to that shown adjacent the opposite side of conveyor assembly 20 in order to seal the opposed side of the package.

It has been found desirable to mount the ultrasonic horn resiliently so that it can move vertically as shown by arrow V1–V2 along its vertical axis. By this means, during the ultrasonic heatsealing process the horn tip can maintain an optimum sealing pressure at the container flange while the plastics flange is softening and becoming more fluid by being urged downwardly to compensate for the reduced thickness of the overlapped area as the flange melts.

In order to provide for resilient vertical movement of the ultrasonic horn a pneumatic or hydraulic (or other form of) damping device 64 is mounted alongside the heatsealing mechanism 50. Device 64 includes an extensible and retractable leg 66 which engages a transverse arm 68 extending from mechanism 50 and which, in use, urges the horn H downwardly, so that a substantially constant gap 'g' between the horn tip HT and the uppermost surface of the counterplate blocks is maintained throughout the heatsealing process. The gap 'g' may be preset to a desired value with the aid of an adjustable stop 70.

EXAMPLE

Figure 1:
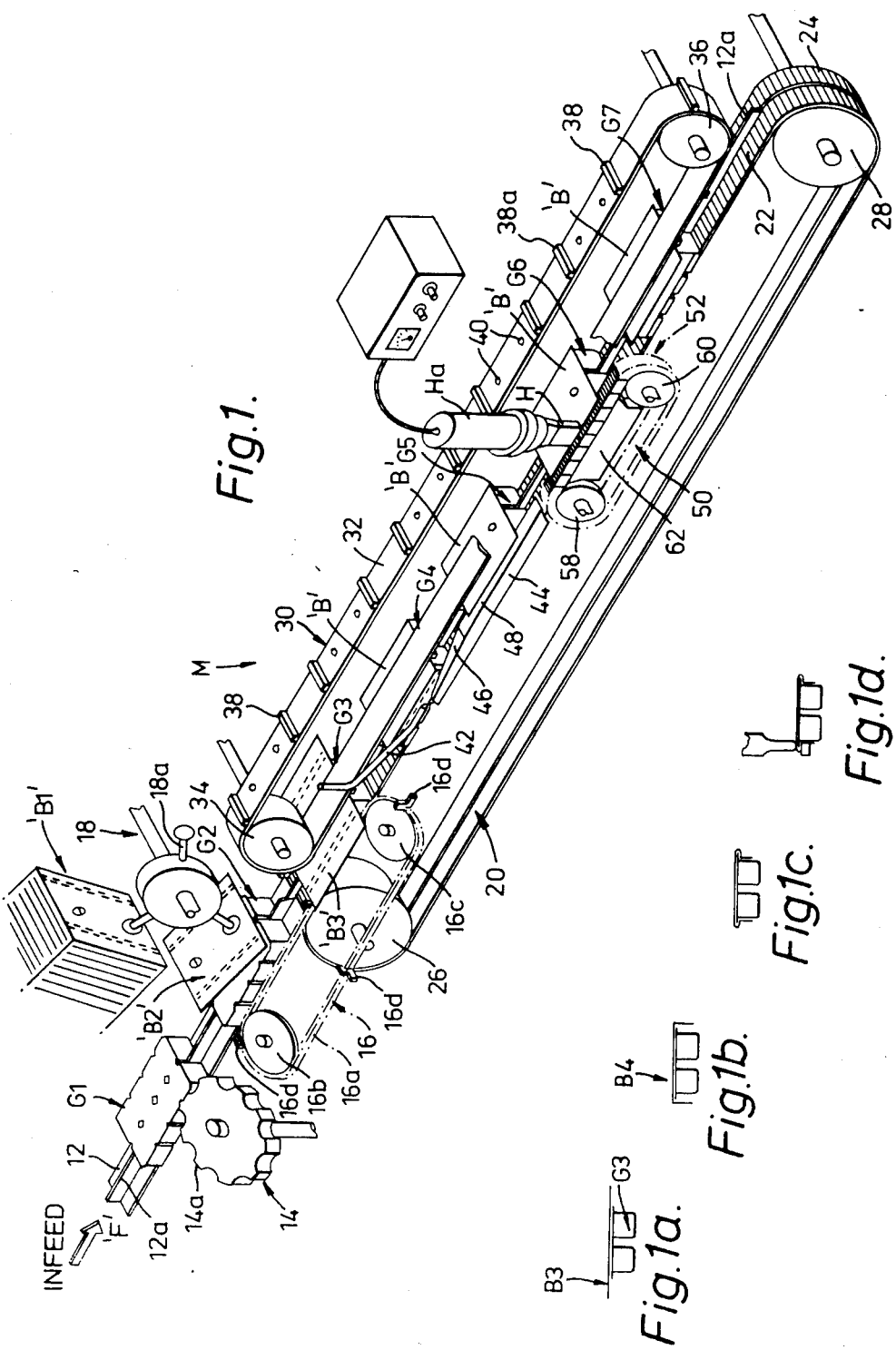
FIG. 1 is a schematic, perspective view of a machine for applying, folding and ultrasonically heat-sealing a paperboard blank to a group of containers to form a package.

The following example gives a set of parameters which produce a satisfactory seal at the board/flange interface at a linear speed of 52 m/min in relation to a package comprising a group of plastics containers in a 2×4 cups configuration (as shown in FIG. 1) having a package length i.e. seal length of 252 mm and in which the flange width i.e. seal width is 4.5 mm. The power supplied to the ultrasonic generator was 1.2 kw and the frequency at the tip of the horn was 20,000 HZ.

Figure 4:
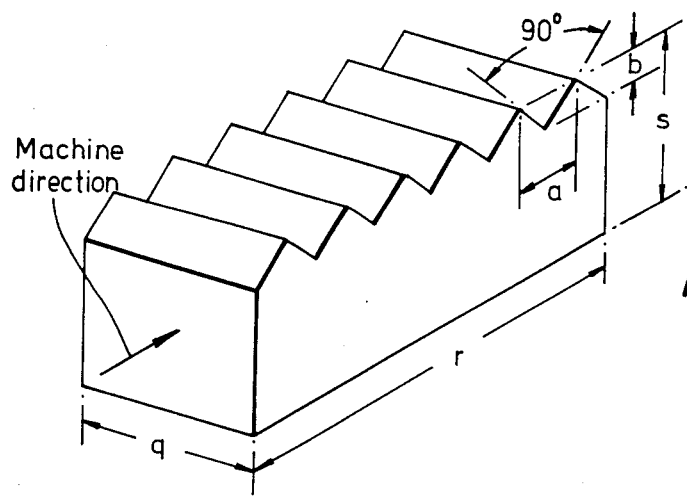
FIG. 4 is an enlarged perspective view of one of the counterpart blocks or anvils used in the mechanism depicted in FIGS. 2 and 3.

1. The Horn
Length (dimension 'l') = 80 mm
Width (dimension 'y') = 8 mm
Amplitude (dimension x/y) = 74 microns
Material = Titanium 2. The Counterpart Blocks
See FIG. 4. The upper surface of each of the counterpart blocks is serrated by a series of transverse (in relation to flow path F) ridges, as shown in FIG. 4. All dimensions shown are in millimeters. The ridge dimensions are as follows:
a = 1.5 mm
b = 0.75 mm
q = 12 mm
r = 25 mm
s = 10 mm 3. Horn/Counterpart Block Gap (Pressure)
During ultrasonic heatsealing, total thickness of the materials = Plastics (flange) + Lid + Paperboard (Blank)
= 0.97 mm + 0.04 mm + (0.37 × 2) mm
= 1.75 mm Gap 'g' is set at between 0.95 mm and 1.05 mm i.e. 0.95 mm < g < 1.05 mm.

The upstream end of the horn tip HT may be bevelled or flared to facilitate the overlapped side edge portions to move into gap 'g'. The horn tip itself may be coated with TFE material or the like to reduce friction as the overlapped side edge portions are advanced while the horn tip applies pressure thereto.

It has been found that when 'g' > substantially 1.05 mm the seal strength becomes unacceptable and when 'g' < substantially 0.95 mm damage (scoring) to the blank and/or container lid occurs.

The following table gives a series of static test loads (in Kg) applied to the carton sufficient to break the seal between the paperboard and the plastics material of the container flanges all of which are regarded as being associated with satisfactory flange/board sealing.

| Pressure | GAP 'G' (mm) | | |
|---|---|---|---|
| (Kgf) | 0.95 | 1.00 | 1.05 |
| 49.60 | 4.46 Kg | 3.14 Kg | 3.3 Kg |
| 63.75 | 4.14 Kg | 3.26 Kg | 2.98 Kg |
| 73.00 | 4.7 Kg | 3.32 Kg | 3.00 Kg |

The pressure in the above table is that applied by the ultrasonic horn tip during the heating process.

It is envisaged that the package could comprise a single container having opposed outwardly projecting flanges at the top thereof rather than the multiple container package described and shown in FIG. 5a.

I claim:

1. A method of forming a package whereby a blank of paperboard or similar foldable sheet material is secured to the top of a container made of thermoplastic material and having opposed outwardly projecting flanges at the top thereof and said blank comprises a top panel and securing strips foldably joined to the side edges of said top panel, which method comprises the steps of
(a) continuously advancing said blank and container in a longitudinal direction and in a single horizontal plane,
(b) applying said blank to the top of said container so that the top panel covers the top of said container and said securing strips extend beyond the flanges thereof, (c) folding said securing strips of said blank into contact with the undersides of said flanges so that at least portions of said flanges are interposed between portions of said top panel and said securing strips to form overlapped side edge portions, (d) applying pressure to said overlapped side edge portions and simultaneously subjecting said overlapped side edge portions to ultrasonic energy whereby said securing strips are welded to the undersides of said container flanges, characterised in that said ultrasonic energy is provided by a stationary ultrasonic horn having a longitudinally extending tip and in that an anvil means is provided between said tip and arranged in spaced relationship thereto so that a predetermined gap is formed between said tip and said anvil means within which said overlapped side edge portions are received.

2. The method of claim 1, further characterised in that said anvil means is mounted on continuously moving endless chains.

3. The method of claim 1, further characterised in that pressure is exerted on said side edge portions by said horn which is adjustably and resiliently mounted.

4. The method of claim 1, further characterised in that said gap is set to correspond to about 50% to 60% of the thickness of the overlapped side edge portions as measured prior to exposure to the ultrasonic energy.

5. The method of claim 4, further characterised in that the upstream end of said horn tip is flared to facilitate said overlapped side edge portions to move into said gap.

6. The method of claim 5, further characterised in that said tip of the horn has a longitudinal dimension of about 80 mm and the linear speed at which the overlapped side edge portions move underneath said tip is approximately 52 m/min.

7. The method of claim 6, wherein the frequency of vibrations at said tip is 20,000 HZ.

8. The method of claim 1, further characterised in that said anvil means has a serrated upper surface.

* * * * *

UNITED STATES PATENT AND TRADEMARK OFFICE
CERTIFICATE OF CORRECTION

PATENT NO. : 4,750,955
DATED : June 14, 1988
INVENTOR(S) : Hubert Haguenier

It is certified that error appears in the above-identified patent and that said Letters Patent is hereby corrected as shown below:

Column 7, line 14, "between" should read --beneath--.

Signed and Sealed this

Twenty-sixth Day of December, 1989

*Attest:*

JEFFREY M. SAMUELS

*Attesting Officer*     *Acting Commissioner of Patents and Trademarks*